United States Patent
Aggarwal et al.

(10) Patent No.: US 11,394,987 B2
(45) Date of Patent: Jul. 19, 2022

(54) CHROMA SAMPLES FROM LUMA SAMPLES PREDICTION FOR VIDEO CODING

(71) Applicant: QUALCOMM Incorporated, San Diego, CA (US)

(72) Inventors: Dhruv Aggarwal, San Jose, CA (US); Anand Singh, Carlsbad, CA (US); Akarsh Ningoji Rao Kolekar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/119,810

(22) Filed: Dec. 11, 2020

(65) Prior Publication Data
US 2022/0191526 A1    Jun. 16, 2022

(51) Int. Cl.
*H04N 19/426* (2014.01)
*H04N 19/50* (2014.01)

(52) U.S. Cl.
CPC ........... *H04N 19/426* (2014.11); *H04N 19/50* (2014.11)

(58) Field of Classification Search
CPC .............................. H04N 19/426; H04N 19/50
See application file for complete search history.

(56) References Cited

U.S. PATENT DOCUMENTS

| | | | | |
|---|---|---|---|---|
| 6,075,899 A * | 6/2000 | Yoshioka | ............. | H04N 19/423 382/233 |
| 11,146,801 B1 * | 10/2021 | Zhao | .................... | H04N 19/186 |
| 2013/0142255 A1 * | 6/2013 | Matsunobu | .......... | H04N 19/117 375/240.03 |
| 2013/0188705 A1 | 7/2013 | Liu | | |
| 2015/0124865 A1 * | 5/2015 | Kim | ..................... | H04N 19/136 375/240.02 |
| 2017/0150176 A1 * | 5/2017 | Zhang | ................... | G06F 17/147 |
| 2018/0205946 A1 | 7/2018 | Zhang et al. | | |
| 2020/0112740 A1 | 4/2020 | Chien et al. | | |
| 2021/0067802 A1 * | 3/2021 | Jin | ....................... | H04N 19/117 |

FOREIGN PATENT DOCUMENTS

| WO | 2020040619 A1 | 2/2020 |
|---|---|---|
| WO | 2020069652 A1 | 4/2020 |

OTHER PUBLICATIONS

De Rivaz P., et al., "AV1 Bitstream & Decoding Process Specification", Jan. 8, 2019, 681 pages.

(Continued)

*Primary Examiner* — Richard T Torrente
(74) *Attorney, Agent, or Firm* — Shumaker & Sieffert, P.A.

(57) ABSTRACT

A video coder may be configured code a chroma block of video data as a function of reconstructed luma samples. The video coder may store, during the prediction process for a luma block, a sum of the reconstructed luma sample values for each sub-block of the luma block in a first buffer, and store, during the prediction process for the luma block, an average of the reconstructed luma sample values in a second buffer. The video coder may perform chroma from luma prediction to reconstruct a chroma block of the video data corresponding to the luma block using the sums and the average.

34 Claims, 5 Drawing Sheets

(56) References Cited

OTHER PUBLICATIONS

ITU-T H.265, Series H: Audiovisual and Multimedia Systems, Inftastructure of Audiovisual Services—Coding of Moving Video, High Efficiency Video Coding, The International Telecommunication Union, Jun. 2019, 696 Pages.
Goebel J., et al., "Hardware Design of DC/CFL Intra-Prediction Decoder for the AV1 Codec", Integrated Circuits and Systems Design, ACM, 2 Penn Plaza, Suite 701 New York NY 10121-0701 USA, Aug. 26, 2019 (Aug. 26, 2019), pp. 1-6, XP058440791, DOI: 10.1145/3338852.3339873 ISBN: 978-1-4503-6844-5.
Han J., et al., "A Technical Overview of AV1", arxiv.org, Cornell University Library, 201 Olin Library Cornell University Ithaca, NY 14853, Aug. 13, 2020 (Aug. 13, 2020), pp. 1-25, XP081740460.
International Search Report and Written Opinion—PCT/US2021/054223—ISA/EPO—Feb. 2, 2022, 13 pp.
Trudeau L., et al., "Predicting Chroma from Luma in AV1", arxiv.org, Cornell University Library, 201 Olin Library Cornell University Ithaca, NY 14853, Nov. 10, 2017 (Nov. 10, 2017), 9 Pages, XP081307998.

\* cited by examiner

CHROMA SAMPLES FROM LUMA SAMPLES PREDICTION FOR VIDEO CODING

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards, as well as proprietary video codecs/formats, such as AOMedia Video 1 (AV1), that was developed by the Alliance for Open Media. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice or a video tile (e.g., a video picture or a portion of a video picture) may be partitioned into video blocks, which may also be referred to as coding blocks, superblocks, coding tree units (CTUs), coding units (CUs) and/or coding nodes. Video blocks in an intra coded (I) slice of a picture are encoded using spatial prediction with respect to reference samples (also called prediction samples) in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for encoding and decoding video data. In particular, this disclosure describes techniques for encoding and decoding video data using a chroma from luma (CFL) prediction mode. When coding video data using the CFL prediction mode, a video coder may determine prediction samples for a chroma block of video data using reconstructed luma samples in a corresponding luma block. The video coder may determine the prediction samples for CFL prediction mode based on sums of reconstructed luma samples in sub-blocks (e.g., 2×2 sub-blocks) of the corresponding luma block, as well as an average luma value of the luma samples of the luma block.

In some example techniques, reconstructed luma samples are stored in memory prior to performing CFL prediction. To perform CFL prediction, a video coder reads out the previously reconstructed luma samples in a first read state to calculate and store the sums and averages. Then the video coder reads out the sums and averages to determine the prediction samples for CFL prediction.

Rather than reading out previously stored reconstructed luma samples from memory to perform CFL prediction on chroma samples, a video coder may be configured to calculate and store the luma sums (e.g., 2×2 luma sums) and accumulate the luma average for the luma block during the process of reconstructing the luma samples. In this way, a video coder need only perform one read process (e.g., reading out the previously calculated luma sums and luma average) during the CFL prediction process. As such, the amount of memory needed for hardware implementation of the CFL prediction process is reduced. In addition, since the read out process for previously stored reconstructed luma samples is eliminated relative to other CLF implementation techniques, the number of processing cycles needed to perform CFL prediction is reduced. Accordingly, video coding speed may be increased.

In one example, a device includes one or more memory units configured to store video data, and one or more processors implemented in circuitry and in communication with the one or more memory units. The one or more processors configured to perform a prediction process for a luma block of the video data to form reconstructed luma sample values. The one or more processors are further configured to store, during the prediction process for the luma block, a sum of the reconstructed luma sample values for each sub-block of the luma block in a first buffer of the one or more memory units, and store, during the prediction process for the luma block, an average of the reconstructed luma sample values in a second buffer. The one or more processors are further configured to perform chroma from luma prediction to reconstruct a chroma block of the video data corresponding to the luma block using the sums of the reconstructed luma sample values for each sub-block of the luma block and the average of the reconstructed luma sample values.

In another example, a method includes performing a prediction process for a luma block of the video data to form reconstructed luma sample values, storing, during the prediction process for the luma block, a sum of the reconstructed luma sample values for each sub-block of the luma block in a first buffer of the one or more memory units, storing, during the prediction process for the luma block, an average of the reconstructed luma sample values in a second buffer, and performing chroma from luma prediction to reconstruct a chroma block of the video data corresponding to the luma block using the sums of the reconstructed luma sample values for each sub-block of the luma block and the average of the reconstructed luma sample values.

In another example, a device includes means for performing a prediction process for a luma block of the video data to form reconstructed luma sample values, means for storing, during the prediction process for the luma block, a sum of the reconstructed luma sample values for each sub-block of the luma block in a first buffer of the one or more memory units, means for storing, during the prediction process for the luma block, an average of the reconstructed luma sample values in a second buffer, and means for performing chroma from luma prediction to reconstruct a chroma block of the video data corresponding to the luma block using the sums of the reconstructed luma sample values for each sub-block of the luma block and the average of the reconstructed luma sample values.

In another example, this disclosure describes a non-transitory computer-readable storage medium storing instructions that, when executed, cause one or more processors of a device configured to decode video data to perform a prediction process for a luma block of the video data to form reconstructed luma sample values, store, during the prediction process for the luma block, a sum of the reconstructed luma sample values for each sub-block of the luma block in a first buffer of the one or more memory units, store, during the prediction process for the luma block, an average of the reconstructed luma sample values in a second buffer, and perform chroma from luma prediction to reconstruct a chroma block of the video data corresponding to the luma block using the sums of the reconstructed luma sample values for each sub-block of the luma block and the average of the reconstructed luma sample values.

The details of one or more examples are set forth in the accompanying drawings and the description below. Other features, objects, and advantages will be apparent from the description, drawings, and claims.

DETAILED DESCRIPTION

In general, this disclosure describes techniques for encoding and decoding video data. In particular, this disclosure describes techniques for encoding and decoding video data using a chroma from luma (CFL) prediction mode. When coding video data using the CFL prediction mode, a video coder may determine prediction samples for a chroma block of video data using reconstructed luma samples in a corresponding luma block. The video coder may determine the prediction samples for CFL prediction based on sums of reconstructed luma samples in sub-blocks (e.g., 2×2 sub-blocks) of the corresponding luma block, as well as an average luma value of the luma samples of the luma block.

In some example techniques, reconstructed luma samples are stored in memory prior to performing CFL prediction. To perform CFL prediction, a video coder must read out the previously reconstructed luma samples in a first read state to calculate and store the sums and averages. Then the video coder must read out the sums and averages to determine the prediction samples for CFL prediction.

Rather than reading out previously stored reconstructed luma samples from memory to perform CFL prediction on chroma samples, a video coder may be configured to calculate and store the luma sums (e.g., 2×2 luma sums) and accumulate the luma average for the luma block during the process of reconstructing the luma samples. In this way, a video coder need only perform one read process (e.g., reading out the previously calculated luma sums and luma average) during the CFL prediction process. As such, the amount of memory needed for hardware implementation of the CFL prediction process is reduced. In addition, since the read out process for previously stored reconstructed luma samples is eliminated relative to other CFL implementation techniques, the number of processing cycles needed to perform CFL prediction is reduced. Accordingly, video coding speed may be increased.

Figure 1:
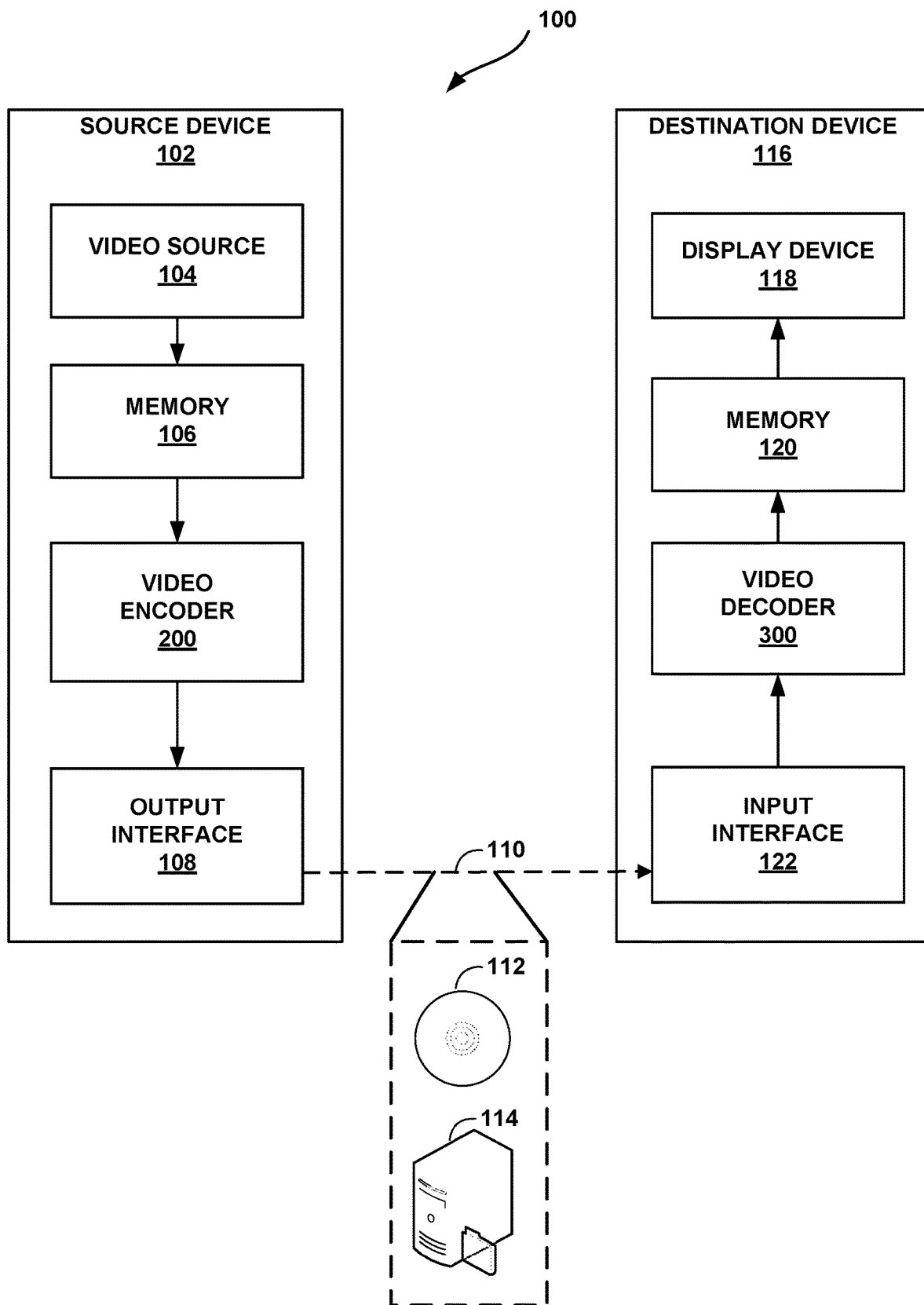
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for encoding and decoding chroma samples of a chroma block of video data using chroma from luma prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for encoding and decoding chroma samples of a chroma block of video data using chroma from luma prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

In some examples of the disclosure, video encoder 200 and video decoder 300 may operate according to a video coding format, such as AOMedia Video 1 (AV1) or extensions thereto, as well as successor coding formats (e.g., AV2) that may currently be in development or will be forthcoming. In other examples, video encoder 200 and video decoder 300 may operate according to other proprietary or industry standards. The techniques of this disclosure, however, are not limited to any particular coding standard and/or video coding format. In general, video encoder 200 and video decoder 300 may be configured to perform the techniques of this disclosure in conjunction with any video coding techniques that use luma sample values to encode or decode chroma sample values.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

This disclosure may use "N×N" and "N by N" interchangeably to refer to the sample dimensions of a block (such as a coding block, superblock, or other block of video data) in terms of vertical and horizontal dimensions, e.g., 16×16 samples or 16 by 16 samples. In general, a 16×16 coding block will have 16 samples in a vertical direction (y=16) and 16 samples in a horizontal direction (x=16). Likewise, an N×N coding block generally has N samples in a vertical direction and N samples in a horizontal direction, where N represents a nonnegative integer value. The samples in a coding block may be arranged in rows and columns. Moreover, coding blocks need not necessarily have the same number of samples in the horizontal direction as in the vertical direction (i.e., the coding block may be non-square). For example, coding blocks may comprise N×M samples, where M is not necessarily equal to N.

When operating according to the AV1 codec, video encoder 200 and video decoder 300 may be configure to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of the block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding enables parallel processing and multi-threading for encoder and decoder implementations.

In some examples, a coding block includes a coding bock of luma samples and two coding blocks of corresponding chroma samples for a picture that has three sample arrays. In other examples, a coding block comprises a single coding block of luma samples (e.g., for a monochrome picture). AV1 supports 4:0:0 chroma subsampling (e.g., monochrome), 4:2:0 chroma subsampling, 4:2:2 chroma subsampling, and 4:4:4 chroma subsampling (i.e., no chroma subsampling). AV1 may code video data in a YUV color space where Y is a luma component, U is a first chroma component (e.g., blue projection), and V is a second chroma component (e.g., red projection).

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

The difference between the currently encoded samples and predicted values generated from the reference samples is called a residual. Video encoder 200 may encode the residual values (e.g., through transformation, quantization, and entropy coding) in an encoded video bitstream. Video decoder 300 may decode the residual values, determine predicted values generated from the reference samples in the same manner as video encoder 200, and add the predicted values generated from reference samples to the residuals to reconstruct the coding block The intra prediction modes of AV1 include directional intra prediction, non-directional smooth intra prediction, recursive filter intra prediction, chroma from luma (CFL) prediction, intra block copy, and color palette modes. Video encoder 200 may encode syntax elements that indicate the intra prediction mode used to video decoder 300.

Video encoder 200 may generally form a prediction block for the coding block using one of the aforementioned inter prediction modes or intra prediction modes (e.g., excluding color palette mode). In general, video encoder 200 subtracts the value of the sample of the coding block from a prediction sample determined according to one of the intra prediction modes or inter prediction modes to determine a residual block. Video decoder 300 performs the inverse of this operation. Video decoder 300 determines the prediction samples in the same manner as video encoder 200, but adds the decoded residual to the prediction sample to reconstruct the coding block.

To encode a block using directional intra prediction, video encoder 200 may determine particular directional intra prediction mode to determine the prediction samples. AV1 provides fifty-six directional intra prediction modes. When encoding a coding block using directional intra prediction, video encoder 200 uses a directional predictor that projects each sample of the coding block to a prediction sample location. The prediction sample location may be a sub-pixel location (e.g., between samples). In such a case, video encoder may use interpolation (e.g., a 2-tap bilinear filter) to determine the value of the prediction sample.

In non-directional smooth intra prediction, video encoder 200 may determine prediction samples according a DC prediction mode, a Paeth prediction mode, or by using one of three smooth predictors. In DC prediction mode, video encoder 200 predicts samples of a block from the average of available neighboring reference samples. In Paeth prediction mode, video encoder 200 uses one of a top reference sample, left reference sample, or top-left edge reference sample which has a value closest to (top+left−topleft). Video encoder 200 may determine the three smooth predictors using quadratic interpolation in a horizontal direction, a vertical direction, or the average of the interpolations in the horizontal and vertical directions.

Video encoder 200 may determine to use recursive filter intra prediction in situations where there is reduced spatial correlation between samples of the coding blocks and prediction samples at the edges of coding blocks. To perform recursive intra prediction, video encoder 200 may determine one of five filter intra modes. Each of the five intra modes are defined by a set of 7-tap filters that specify a correlation between samples in a 4×2 sub-block and seven adjacent neighboring samples. Video encoder 200 may determine one of five types of intra filter modes at the block level and predict samples in 4×2 sub-blocks.

Video encoder 200 may determine to use chroma from luma (CFL) to predict chroma samples from corresponding reconstructed luma samples. In particular, video encoder 200 may use sums of reconstructed luma samples in sub-blocks (e.g., 2×2 sub-blocks) of a luma block minus the average luma sample value of the block, as well as DC prediction samples for the chroma block, to determine a final prediction sample for predicting the chroma samples. The sums of reconstructed luma samples in sub-blocks (e.g., 2×2 sub-blocks) of a luma block minus the average luma sample value of the block represent an "AC" contribution from the luma block.

In intra block copy mode, video encoder 200 and video decoder 300 may predict a coding block using a previously-reconstructed coding block as a reference block, where the reference block is in the same frame as the currently coded coding block. Video encoder 200 may indicate a location of the previously-reconstructed coding block using a displacement vector (e.g., an x and y displacement from the currently coded coding block). Intra block copy mode is similar to a translational inter prediction mode, but rather than using a reference block in another frame, the intra block copy mode uses a reference block from the same frame. Intra block copy mode may be particularly useful for so-called "screen content" video frames that may include text, characters, and/or repeated textures (e.g., such as video displaying the contents of a computer screen).

In each of the aforementioned intra prediction modes, video encoder 200 may generate a residual block by subtracting the sample values of a currently coded block from prediction pixels generated in accordance with one of the intra prediction modes. Color palette mode is considered another type of intra prediction mode, as color palette mode does not use predicted samples generated from reference samples values. However, video encoder 200 and video decoder 300 do not encode and decode, respectively, residual values in color palette mode. Instead, video encoder 200 may associate code information that indicates an index to a color palette for each sample/pixel of the coding block. The color palette is a table of color values. Color palette mode may be useful for frames of video data with an limited number of unique colors (e.g., screen content).

When predicting blocks of a current frame of video data using an inter prediction mode, video encoder 200 and video decoder 300 may use video data from one or more reference frames of video data. Video encoder 200 may encode sample values based on the differences (e.g., the residuals) between sample values of a current block to be coded and prediction samples within a different frame (e.g., a reference frame). The reference frame may be before or after the currently coded frame in presentation order. Video encoder 200 may determine the prediction samples and reference frame based on the inter prediction mode.

Like for intra prediction modes (excepting color palette mode), video encoder 200 may encode the residual values (e.g., through transformation, quantization, and entropy coding) in an encoded video bitstream. Video decoder 300 may decode the residual values, determine the prediction block in the same manner as video encoder 200, and add the prediction block to the residuals to reconstruct the coding block. Video encoder 200 may determine a particular inter prediction mode from among a plurality of inter prediction modes that provides the best rate-distortion cost. Video encoder 200 may encode the mode information, residual values (e.g., the difference between a current sample and a prediction sample), and other block characteristics in an encoded video bitstream. The inter prediction modes of AV1 include translational motion compensation, affine motion compensation (e.g., warped motion compensation), overlapped block motion compensation (OBMC), and compound inter-intra predictor modes.

For translational motion compensation, video encoder 200 may generate the prediction block (e.g., the block including the prediction samples) using one or more motion vectors. Video encoder 200 may generally perform a motion search to identify a reference block that closely matches the coding block, e.g., in terms of differences between the samples of the coding block and the prediction samples of the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current coding block using uni-directional prediction or bi-directional prediction.

Video encoder 200 may also encode the motion vector(s) using a prediction method. For example, video encoder 200 may encode motion vectors with reference to other candidate motion vectors, including spatial motion vectors (e.g., motion vectors of neighboring blocks encoded using inter prediction) or temporal motion vectors (e.g., motion vectors from co-located blocks in other pictures coded using inter prediction). The candidate motion vectors may be added to a dynamic motion vector reference list.

AV1 also provide an affine motion compensation mode. In affine motion compensation mode, video encoder 200 may determine the warping parameters to warp the reference block to get the prediction using neighboring candidates' motion vectors. The warping parameters represent non-translational or affine motion, such as zoom in or out, rotation, perspective motion, or other irregular motion types.

Video encoder 200 may use OBMC mode to decrease prediction errors near block edges. In OBMC mode, video encoder 200 and video decoder 300 determines prediction samples using prediction samples generated based on motion vectors from the top neighboring block and/or the left neighboring block. Video encoder 200 and video decoder 300 may generate the final prediction samples by combining such prediction samples using smoothing filters.

In compound inter-intra predictor mode, video encoder 200 and video decoder 300 may form a prediction sample using both inter prediction and intra prediction techniques. Two prediction samples may be combined using weighting coefficients.

When performing a prediction process, such as intra prediction or inter prediction of a block, video encoder 200 may calculate residual data for the block. The residual data, such as a residual block, represents sample by sample differences between the block and prediction samples for the block, formed using the corresponding prediction mode. Video encoder 200 may apply one or more transforms to the residual block, to produce transformed data in a transform domain instead of the sample domain. For example, video encoder 200 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may entropy encode syntax elements, including syntax element indicating the value of quantized transform coefficients. As another example, video encoder 200 may entropy encode prediction syntax elements (e.g., motion information for inter prediction or intra mode information for intra prediction). In accordance with AV1, video encoder 200 may be configured to perform entropy encoding using a symbol-to-symbol adaptive multi-symbol arithmetic coder. A syntax element in AV1 includes an alphabet of N elements, and a context (e.g., probability model) includes a set of N probabilities. Video encoder 200 may store the probabilities as 15 bit cumulative distribution functions (CDFs). Video encoder 200 may perform recursive scaling, with an update factor based on the alphabet size, to update the contexts.

In this manner, video encoder 200 may generate a bitstream including encoded video data, e.g., syntax elements describing partitioning of a picture into blocks (e.g., superblocks and coding blocks) and prediction modes and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using entropy decoding in a manner substantially similar to, albeit reciprocal to, the entropy encoding process of video encoder 200. The syntax elements may define partitioning information for partitioning of a picture into superblocks and coding blocks. The syntax elements may further define prediction and residual information for blocks (e.g., coding blocks) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (e.g., an intra or inter prediction mode) and related prediction information (e.g., motion information for inter prediction) to form a prediction samples for the block. Video decoder 300 may then combine the prediction samples and the corresponding sample values of the residual block (on a sample-by-sample basis) to reproduce the original block. Video decoder 300 may perform additional processing, such as performing a loop filtering process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be discussed in more detail below, video encoder 200 and video decoder 300 may be configured to perform a prediction process for a luma block of the video data to form reconstructed luma sample values, store, during the prediction process for the luma block, a sum of the reconstructed luma sample values for each sub-block of the luma block in a first buffer of the one or more memory units, store, during the prediction process for the luma block, an average of the reconstructed luma sample values in a second buffer of the one or more memory units, and perform chroma from luma prediction to reconstruct a chroma block of the video data corresponding to the luma block using the sums of the reconstructed luma sample values for each sub-block of the luma block and the average of the reconstructed luma sample values.

Figure 2:
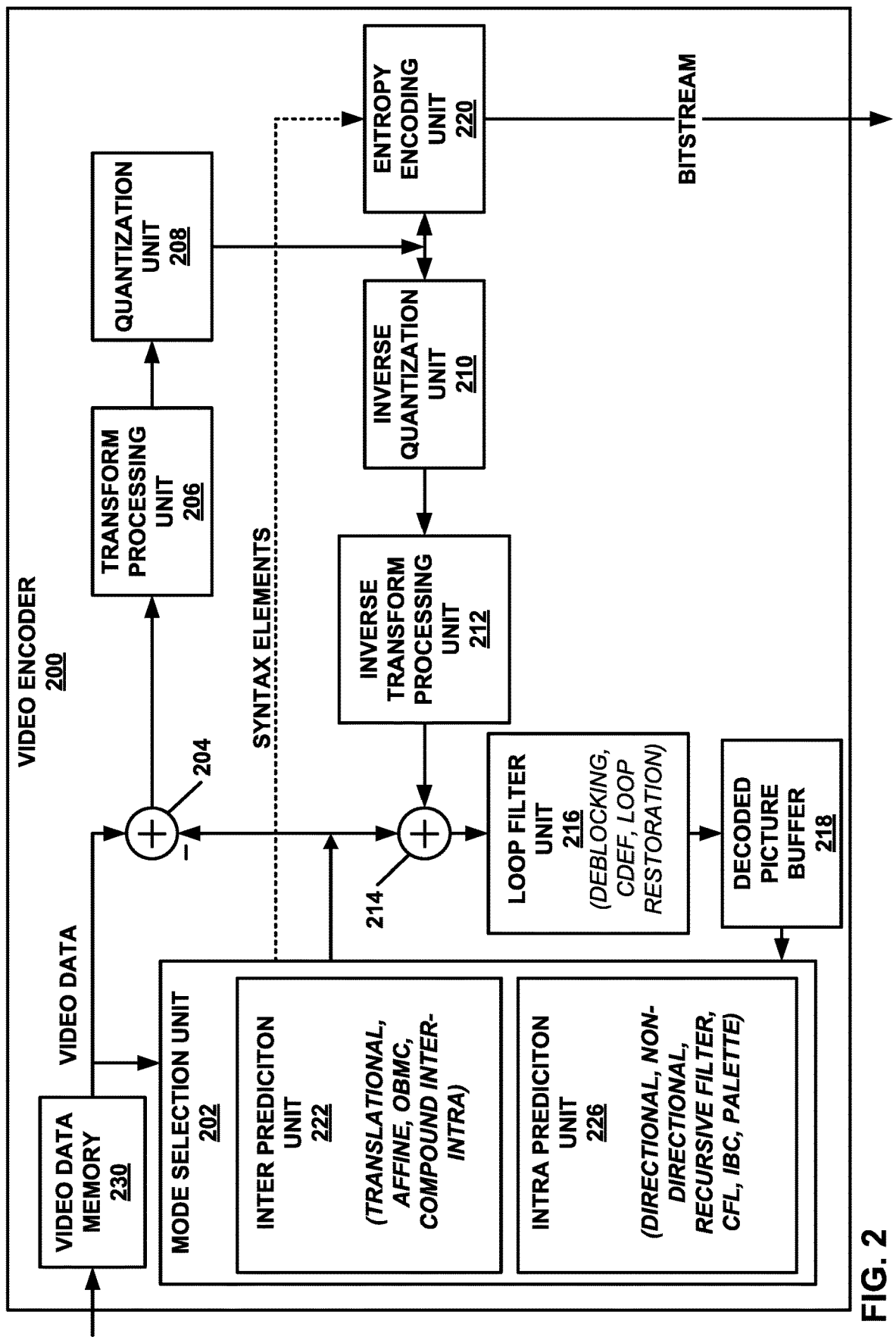
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of the AV1 coding format. However, the techniques of this disclosure may be performed by video encoding devices that are configured to encode video data according to other video coding formats and/or various video coding standards.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, loop filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, loop filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200. For example, as will be explained below, video data memory 230 may include a first buffer and a second buffer for storing the sums and averages of reconstructed luma sample values for CFL prediction.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture/frame of the video data from video data memory 230 and provide the video data to residual generation unit 204 and mode selection unit 202. Video data in video data memory 230 may be raw video data that is to be encoded.

Mode selection unit 202 includes inter prediction unit 222 and intra prediction unit 226. Inter prediction unit 222 may be configured to encode coding blocks of video data (e.g., both luma and chroma coding blocks) using translational motion compensation, affine motion compensation, OBMC, and/or compound inter-intra prediction, as described above. Intra prediction unit 226 may be configured to encode coding blocks of video data (e.g., both luma and chroma coding blocks) using directional intra prediction, non-directional intra prediction, recursive filter intra prediction, CFL, intra block copy (IBC), and/or color palette mode, as described above. Mode selection unit 202 may include additional functional units to perform video prediction in accordance with other prediction modes.

Mode selection unit 202 generally coordinates multiple encoding passes to test combinations of encoding parameters and resulting rate-distortion values for such combinations. The encoding parameters may include partitioning of superblocks into coding blocks, prediction modes for the coding blocks, transform types for residual data of the coding blocks, quantization parameters for residual data of the coding blocks, and so on. Mode selection unit 202 may ultimately select the combination of encoding parameters having rate-distortion values that are better than the other tested combinations.

Video encoder 200 may partition a picture retrieved from video data memory 230 into a series of coding blocks, and encapsulate one or more superblocks within tile. Mode selection unit 202 may partition superblocks of the picture in accordance with a tree structure.

In general, mode selection unit 202 also controls the components thereof (e.g., inter prediction unit 222 and intra prediction unit 226) to generate prediction samples for a current coding block. For example, for translational inter prediction of a current block, inter prediction unit 222 may perform a motion search to identify one or more closely matching reference blocks in one or more reference pictures (e.g., one or more previously coded pictures stored in DPB 218).

In particular, inter prediction unit 222 may calculate a value representative of how similar a potential reference block is to the current block, e.g., according to sum of absolute difference (SAD), sum of squared differences (SSD), mean absolute difference (MAD), mean squared differences (MSD), or the like. Inter prediction unit 222 may generally perform these calculations using sample-by-sample differences between the current block and the reference block being considered. Inter prediction unit 222 may identify a reference block having a lowest value resulting from these calculations, indicating a reference block that most closely matches the current block.

For translational inter prediction, inter prediction unit 222 may form one or more motion vectors (MVs) that defines the positions of the reference blocks in the reference pictures relative to the position of the current block in a current picture. For example, for uni-directional inter prediction, inter prediction unit 222 may determine a single motion vector, whereas for bi-directional inter prediction, inter prediction unit 222 may determine two motion vectors.

Inter prediction unit 222 may then generate a prediction block of prediction samples using the motion vectors. For example, inter prediction unit 222 may retrieve data of the reference block using the motion vector. As another example, if the motion vector has fractional sample precision, inter prediction unit 222 may interpolate values for the prediction block according to one or more interpolation filters. Moreover, for bi-directional inter prediction, inter prediction unit 222 may retrieve data for two reference blocks identified by respective motion vectors and combine the retrieved data, e.g., through sample-by-sample averaging or weighted averaging.

As another example, for intra prediction, intra prediction unit 226 may generate the prediction samples from samples in the same picture as the current block. In some examples, intra prediction unit 226 may generate prediction samples from reference samples that neighbor the current block. For example, for directional intra prediction modes, intra prediction unit 226 may generally mathematically combine values of neighboring samples and use these calculated values in the defined direction across the current block as the prediction block. As another example, for the non-directional DC mode, intra prediction unit 226 may calculate an average of the neighboring samples to the current block to generate the prediction samples.

In accordance with the techniques of this disclosure, intra prediction unit 226 may be configured to encode chroma coding blocks of video data using the CFL prediction mode. In general, when encoding according to the CFL prediction mode, intra prediction unit 226 may be configured to determine prediction samples using DC intra prediction for the chroma samples as well as using the sums and averages of reconstructed luma samples for a corresponding luma coding block.

As will be explained in more detail below, when encoding a chroma coding block, video encoder 200 is configured to reconstruct a luma block of the video data to form reconstructed luma sample values. Video encoder 200 may be configured to store, during the reconstruction process for the luma block, a sum of the reconstructed luma sample values for each sub-block of the luma block in a first buffer of video data memory 230. Video encoder 200 may be further configured to store, during the reconstruction process for the luma block, an average of the reconstructed luma sample values in a second buffer of video data memory 230.

Video encoder 200 may then perform chroma from luma prediction to encode a chroma block of the video data corresponding to the luma block using the sums of the reconstructed luma sample values for each sub-block of the luma block and the average of the reconstructed luma sample values to determine prediction values. In one example, video encoder 200 may perform chroma from luma prediction for chroma samples of the chroma block corresponding to the luma block using the sums of the reconstructed luma sample values for each sub-block of the block and the average of the reconstructed luma sample values, without reading the reconstructed luma samples values from video data memory 230.

By storing the sum of the reconstructed luma sample values for each sub-block and the average of the reconstructed luma sample values in buffers during the prediction process for the luma block, video encoder 200 need not read out any luma sample values to perform chroma from luma prediction for a chroma block. As such, the amount of memory needed to implement chroma from luma prediction is reduced compared to other techniques. In addition, the number of processing cycles needed to perform luma from chroma prediction is reduced.

For other video coding techniques such as an intra block copy mode, affine motion compensation, recursive filter intra prediction, and other prediction modes, as some examples, inter prediction unit 222 or intra prediction unit 226 generates prediction samples in accordance with the techniques of the particular coding mode being used. In some examples, such as color palette mode coding, intra prediction unit 226 may not generate prediction samples, and instead generates syntax elements that indicate the manner in which to reconstruct the block based on a selected color palette. In such modes, mode selection unit 202 may provide these syntax elements to entropy encoding unit 220 to be encoded.

Mode selection unit 202 provides the prediction samples to residual generation unit 204. Residual generation unit 204 receives a raw, unencoded version of the current block from video data memory 230 and the prediction samples from mode selection unit 202. Residual generation unit 204 calculates sample-by-sample differences between the current block and the prediction samples. The resulting sample-by-sample differences define a residual block for the current block. In some examples, residual generation unit 204 may be formed using one or more subtractor circuits that perform binary subtraction.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current coding block. Video encoder 200 (e.g., via mode selection unit 202) may adjust the degree of quantization applied to the transform coefficient blocks associated with the current block by adjusting the QP value associated with the coding block. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current coding block (albeit potentially with some degree of distortion) based on the reconstructed residual block and the prediction samples generated by mode selection unit 202. For example, reconstruction unit 214 may add samples of the reconstructed residual block to corresponding prediction samples generated by mode selection unit 202 to produce the reconstructed block.

Loop filter unit 216 may perform one or more filter operations on reconstructed blocks. For example, loop filter unit 216 may perform deblocking operations to reduce blockiness artifacts along edges of CUs. In other examples, loop filter unit 216 may apply a constrained directional enhancement filter (CDEF), which may be applied after deblocking, and may include the application of non-separable non-linear low-pass directional filters based on estimated edge directions. Loop filter unit 216 may also include a loop restoration filter, which is applied after CDEF, and may include a separable symmetric normalized Wiener filter or a dual self-guided filter. Operations of loop filter unit 216 may be skipped, in some examples.

Video encoder 200 stores reconstructed blocks in DPB 218. For instance, in examples where operations of loop filter unit 216 are not performed, reconstruction unit 214 may store reconstructed blocks to DPB 218. In examples where operations of loop filter unit 216 are performed, loop filter unit 216 may store the filtered reconstructed blocks to DPB 218. Inter prediction unit 222 may retrieve a reference picture from DPB 218, formed from the reconstructed (and potentially filtered) blocks, to inter predict blocks of subsequently encoded pictures. In addition, intra prediction unit 226 may use reconstructed blocks in DPB 218 of a current picture to intra predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter prediction or intra mode information for intra prediction) from mode selection unit 202.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as 15 bit cumulative distribution functions (CDFs). Entropy encoding unit 220 may perform recursive scaling, with an update factor based on the alphabet size, to update the contexts.

Video encoder 200 may output an encoded video bitstream that includes the entropy encoded syntax elements needed to reconstruct blocks of a slice or picture. For example, entropy encoding unit 220 may output the bitstream.

Figure 3:
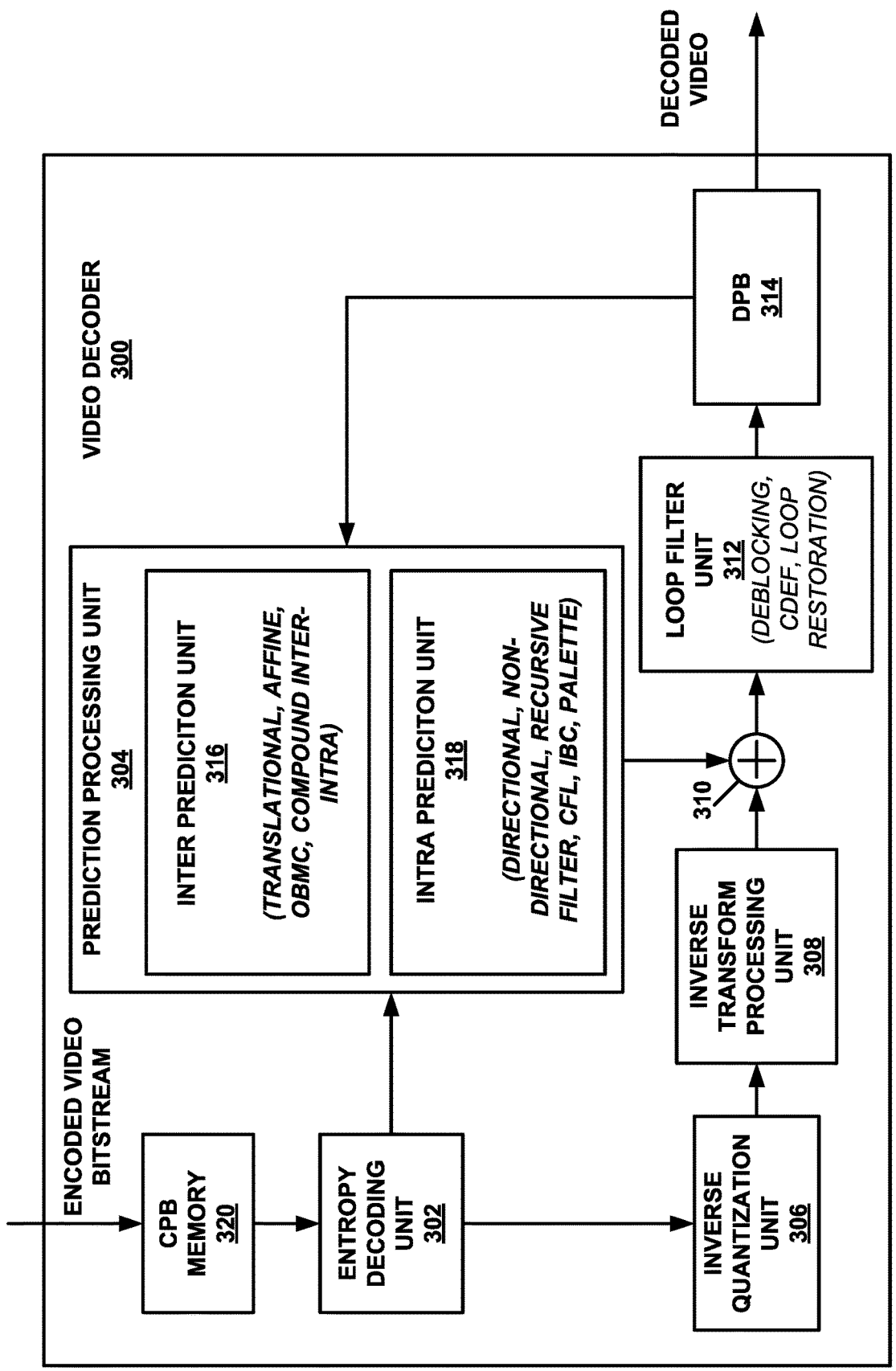
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of the AV1 video coding format. However, the techniques of this disclosure may be performed by video decoding devices that are configured to decode video data according to other video coding formats and/or various other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, loop filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, loop filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes inter prediction unit 316 and intra prediction unit 318. Inter prediction unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above. Prediction processing unit 304 may include additional functional units to perform video prediction in accordance with other prediction modes.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. For example, as will be explained below, CPB memory 320 may include a first buffer and a second buffer for storing the sums and averages of reconstructed luma sample values for CFL prediction.

DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from CPB memory 320 and entropy decodes the video data to reproduce syntax elements. Prediction processing unit 304, inverse quantization unit 306, inverse transform processing unit 308, reconstruction unit 310, and loop filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current coding block. For example, inverse transform processing unit 308 may apply a horizontal/vertical combination of an inverse DCT, inverse ADST, inverse flipped ADST, or an inverse identity transform.

Furthermore, prediction processing unit 304 generates prediction samples according to prediction information syntax elements that were entropy decoded by entropy decoding unit 302. For example, if the prediction information syntax elements indicate that the current block is inter predicted, inter prediction unit 316 may generate the prediction samples. In this case, the prediction information syntax elements may indicate a reference picture in DPB 314 from which to retrieve a reference block, as well as a motion vector identifying a location of the reference block in the reference picture relative to the location of the current block in the current picture. Inter prediction unit 316 may generally perform the inter prediction process in a manner that is substantially similar to that described with respect to inter prediction unit 222 (FIG. 2).

As another example, if the prediction information syntax elements indicate that the current block is intra predicted, intra prediction unit 318 may generate the prediction samples according to an intra prediction mode indicated by the prediction information syntax elements. Again, intra prediction unit 318 may generally perform the intra prediction process in a manner that is substantially similar to that described with respect to intra prediction unit 226 (FIG. 2). Intra prediction unit 318 may retrieve data of neighboring samples to the current block from DPB 314.

In accordance with the techniques of this disclosure, intra prediction unit 318 may be configured to decide chroma coding blocks of video data using the CFL prediction mode. In general, when decoding according to the CFL prediction mode, intra prediction unit 318 may be configured to determine prediction samples using DC intra prediction for the chroma samples as well as using the sums and averages of reconstructed luma samples for a corresponding luma coding block.

As will be explained in more detail below, when decoding a chroma coding block, video decoder 300 is configured to reconstruct a luma block of the video data to form reconstructed luma sample values. Video decoder 300 may be configured to store, during the prediction process for the luma block, a sum of the reconstructed luma sample values for each sub-block of the luma block in a first buffer. Video decoder 300 may be further configured to store, during the prediction process for the luma block, an average of the reconstructed luma sample values in a second buffer.

Video decoder 300 may then perform chroma from luma prediction to encode a chroma block of the video data corresponding to the luma block using the sums of the reconstructed luma sample values for each sub-block of the luma block and the average of the reconstructed luma sample values to determine prediction values. In one example, video decoder 300 may perform chroma from luma prediction for chroma samples of the chroma block corresponding to the luma block using the sums of the reconstructed luma sample values for each sub-block of the block and the average of the reconstructed luma sample values, without reading the reconstructed luma samples values from DPB 314.

By storing the sum of the reconstructed luma sample values for each sub-block (e.g., 2×2 sub-block) and the average of the reconstructed luma sample values in buffers during the prediction process for the luma block, video decoder 300 need not read out any luma sample values to perform chroma from luma prediction for a chroma block. As such, the amount of memory needed to implement chroma from luma prediction is reduced compared to other techniques. In addition, the number of processing cycles needed to perform luma from chroma prediction is reduced.

Reconstruction unit 310 may reconstruct the current block using the prediction block and the residual block. For example, reconstruction unit 310 may add samples of the residual block to corresponding prediction samples to reconstruct the current block.

Loop filter unit 312 may perform one or more filter operations on reconstructed blocks. For example, loop filter unit 312 may perform deblocking operations to reduce blockiness artifacts along edges of the reconstructed blocks. In other examples, loop filter unit 312 may apply a constrained directional enhancement filter (CDEF), which may be applied after deblocking. and may include the application of non-separable non-linear low-pass directional filters based on estimated edge directions. Loop filter unit 312 may also include a loop restoration filter, which is applied after CDEF, and may include a separable symmetric normalized Wiener filter or a dual self-guided filter. Operations of loop filter unit 312 are not necessarily performed in all examples.

Video decoder 300 may store the reconstructed blocks in DPB 314. For instance, in examples where operations of loop filter unit 312 are not performed, reconstruction unit 310 may store reconstructed blocks to DPB 314. In examples where operations of loop filter unit 312 are performed, loop filter unit 312 may store the filtered reconstructed blocks to DPB 314. As discussed above, DPB 314 may provide reference information, such as samples of a current picture for intra prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform a prediction process for a luma block of video data to form reconstructed luma sample values, store, during the prediction process for the luma block, a sum of the reconstructed luma sample values for each sub-block of the luma block in a first buffer of the one or more memory units, store, during the prediction process for the luma block, an average of the reconstructed luma sample values in a second buffer, and perform chroma from luma prediction to reconstruct a chroma block of the video data corresponding to the luma block using the sums of the reconstructed luma sample values for each sub-block of the luma block and the average of the reconstructed luma sample values.

As described above, when operating according to the AV1 codec, video encoder 200 and video decoder 300 may be configured to code one or more chroma coding blocks of video data using a Chroma from Luma (CFL) prediction mode. When operating according to the CFL prediction mode, video encoder 200 and video decoder 300 may be configured to predict the values of chroma samples of a chroma coding block of video data using the values of reconstructed/decoded luma samples of a corresponding luma coding block of video data.

An example CFL prediction process is described below. For the decoding process for spatial prediction in AV1, video decoder 300 may extract the following information for a coding block:

The current prediction mode defining the rules for decoding.

The quantized and inverse-transformed residuals (sample differences with the same block in the original frame) stored for the block.

Coding block dimensions (e.g., in terms of width and height in samples)

Neighbor availability (e.g., the availability of sample values in neighboring coding blocks)

If neighbors are available, the values of neighbor samples at the top, top-right, left, top-left and bottom-left positions relative to the currently decoded coding block.

Based on neighbor sample values and the prediction mode, video decoder 300 generates values called prediction samples. Video decoder 300 may add the generated prediction samples to the decoded residual values to form the final samples of that coding block. These final samples are called the reconstructed samples.

As described above, video encoder 200 and video decoder 300 divides each frame (e.g., picture) into blocks (e.g., superblocks and coding blocks). Video encoder 200 and video decoder 300 may be configured to encode and decode pixel values of the blocks in a 3-color component sample format: Y (luma component), U and V (chroma components mode). Video encoder 200 and video decoder 300 may use the CFL prediction mode to predict chroma sample coding blocks. One difference between the CFL prediction mode and other spatial predictions modes is the CFL mode does not only use neighbor chroma samples for prediction. When coding a coding block of chroma samples according to the CFL prediction mode, video encoder 200 and video decoder 300 also use reconstructed samples from a corresponding luma coding block. In addition, when operating according to the CFL prediction mode, video encoder 200 and video decoder 300 perform scaled blending of chroma DC prediction samples (obtained from DC prediction of the chroma reconstructed neighbors), and then generate the chroma prediction samples. In CFL, the process for coding the U and V components are distinguished by their individual scale factor called alpha. The alpha values of such scale factors may be called CflAlphaU and CflAlphaV. Video decoder 300 may determine these alpha values from one or more syntax elements signaled in the input bitstream.

In accordance with section 11.7.5 of the AV1 specification, video decoder 300 may perform CFL prediction as follows. Video decoder 300 may first reconstruct a luma coding block creating reconstructed luma samples. Video decoder 300 may reconstruct the luma coding block using any prediction mode. Video decoder 300 may divide the reconstructed luma coding block into sub-blocks. For example, the sub-blocks may be 2×2 samples in size. Video decoder 300 may also initialize an average value (LumaAvg) for the samples of the reconstructed luma to be zero. For each 2×2 sub-block, video decoder 300 calculates a sum of all four reconstructed luma sample values, and shifts this sum in accordance with any chroma subsampling (e.g., for 4:2:0 chroma subsampling). Video decoder 300 may determine the amount of shift in accordance with the following equation: Shift=(3−subsampling_in_x_direction_enabled−subsampling_in_y_direction_enabled). Video decoder 300 may store each sum for each 2×2 sub-block of the reconstructed luma block into an array in memory.

The value of subsampling_in_x_direction_enabled may be 1 if chroma samples are subsampled in the X direction. Otherwise, the value of subsampling_in_x_direction_enabled is 0. The value of subsampling_in_u_direction_enabled may be 1 if chroma samples are subsampled in the Y direction. Otherwise, the value of subsampling_in_y_direction_enabled is 0. If chroma samples are subsampled in both the X and Y direction (e.g., as in YUV420 format), the shift value will be 1.

Video decoder 300 may accumulate all the sums for the 2×2 sub-blocks of the reconstructed luma block and calculate an average for the block (e.g., LumaAvg) as: LumaAvg=Round2(sum_of_luma_sums, log 2(Block-Width)+log 2(BlockHeight)), where sum_of_luma_sums is a summation of all the sums of the 2×2 sub-blocks, BlockWidth is the width of the reconstructed luma block in luma samples, and BlockHeight is the height of the reconstructed luma block in luma samples.

To perform the chroma from luma prediction, video decoder 300 maps each sample in a chroma coding block to a corresponding luma sum (e.g., a sum of reconstructed luma samples in a 2×2 sub-block). Video encoder 200 may also determine DC prediction samples for the chroma coding block using a DC intra prediction mode. In some examples, video decoder 300 may determine the DC prediction samples in parallel with determining the luma sums and the luma average. Video decoder 300 may determine a final prediction sample value for each chroma sample using the following equations:

$$ScaledLuma=Round2Signed(alpha*(corresponding\ Luma\ sum-LumaAvg),6)$$

$$Intermediate\ prediction\ sample\ value=DC+ScaledLuma$$

$$Final\ prediction\ sample\ value=clip(0,Intermediate\ prediction\ sample\ value,Max\ sample\ value)$$

The Round2(x,n) function is defined as Round2=(x+(2^(n−1)))>>n (where >> is a right shift operation). The Round2Signed(x,n) function is defined as follows:
If (x>=0)
 Round2Signed(x,n)=Round2(x,n)
Else
 Round2Signed(x,n)=−Round2(−x,n)

First, video decoder 300 may determine a scaled luma sample value (Scaled Luma) for each chroma sample location. Video decoder 300 calculates the scaled luma sample value by determining the difference between the luma sum (corresponding Luma sum) corresponding to the chroma sample and the luma average of the reconstructed luma block (LumaAvg). Video decoder 300 multiplies this difference by the alpha scale value (e.g., CflAlphaU or CflAlphaV) associated with the particular chroma component being decoded (e.g., U chroma or V chroma). Video decoder 300 then rounds the scaled difference to determine the scaled luma sample value (ScaledLuma).

Video decoder 300 may then add the calculated scaled luma sample value with the corresponding DC prediction sample (DC) for the currently decoded chroma sample to produce an intermediate prediction sample value. Video decoder 300 may then determine the final prediction sample value by clipping the intermediate prediction sample value between 0 and a maximum sample value (Max sample value). Video decoder 300 may then reconstruct the chroma sample value by adding the final prediction sample value to a corresponding decoded residual value. Note that, if the chroma coding block that is being coded is partially outside the frame, then its corresponding luma block will be partially out of frame as well. In that case, for predicting the out of frame section, video decoder 300 may replicate the last row/column of that block at the frame edge.

More generally, in one example, video decoder 300 may be configured to perform chroma from luma prediction by reconstructing each chroma sample value from a corresponding luma sum (e.g., 2×2 luma sum from a corresponding 2×2 luma sub-block) and the average of the reconstructed luma values. For example, video decoder 300 may calculate each respective chroma sample using the difference between a respective sum of the reconstructed luma sample values of a respective sub-block (e.g., 2×2 sub-block) corresponding to the respective chroma sample, and the average of the reconstructed luma sample values. In a further example, video decoder 300 may calculate each respective chroma sample using a scaling factor to scale the difference between a respective sum of the reconstructed luma sample values of a respective sub-block (e.g., 2×2 sub-block) corresponding to the respective chroma sample, and the average of the reconstructed luma sample values. In a still further example, video decoder 300 may perform a DC intra prediction process to determine a respective DC prediction values for each respective chroma sample of the chroma block, and to calculate each respective chroma sample by adding the respective DC prediction value to the difference or scaled difference between a respective sum of the reconstructed luma sample values of a respective sub-block (e.g., 2×2 sub-block) corresponding to the respective chroma sample, and the average of the reconstructed luma sample values.

The foregoing description was described with reference to video decoder 300. Video encoder 200 would perform the same process in a reconstruction loop. Video encoder 200 may calculate the residual value for the chroma coding block by determining the final prediction sample value in the same manner described above, and then subtracting the final prediction sample value from the corresponding chroma sample value to create a residual chroma sample value.

In one example prior hardware implementation of the above CFL process, a video coder (e.g., video encoder 200 and/or video decoder 300) would first perform a prediction process on a luma coding block to form reconstructed luma samples. Video encoder 200 and video decoder 300 would store the reconstructed luma samples values in a memory (e.g., a buffer). When performing the CFL process for a chroma coding block, video encoder 200 and video decoder 300 may be configured to read out the reconstructed luma sample values from the buffer (e.g., in a "read 1" stage from memory) to compute the luma sums of each 2×2 sub-block and accumulate the average luma value of the reconstructed luma block. Video encoder 200 and video decoder 300 would then store the computed sums and average in another memory. Then, video encoder 200 and video decoder 300 would read out the luma sums in 2×2 sub-block order (e.g., in a "read 2" stage from memory) to determine the final prediction sample values, as described above. Video encoder 200 and video decoder 300 would also read out the luma average from the memory.

Given this 2-stage read process, the memory area (e.g., RAM) requirement of a buffer for an M×M block with N-bit bit-depth sample format would be M×M×N bits. For example, for a 64×64 luma coding block with 10-bit luma sample values, the RAM size would be 64×64×10=40,960 bits. If video encoder 200 and/or video decoder 300 is configured to process K components per cycle, after reconstructing the luma coding block, the number of processing cycles per read stage is:

Cycles by "read 1" stage=(M×M)/K
Cycles by "read 2" stage=(M×M)/K
Total cycles=2×(M×M)/K In general, the above example prior hardware implementation for CFL prediction uses a relatively large amount of memory and a relatively large number of cycles to complete.

In order to reduce the memory needed and the total number of cycles performed for CFL prediction, this disclosure proposes the following hardware implementation. Instead of storing each reconstructed luma sample value in memory after the prediction process for a luma block, and then calculating the luma sums (e.g., 2×2 luma sums) and average for the luma block during the CFL prediction for a chroma block, as was described above, video encoder 200 and video decoder 300 may be configured to calculate and store the sum of each luma sub-block (LumaSum) into a first buffer (e.g., a RAM) and accumulate and store the average of the Luma block in a second buffer (e.g., the same or different RAM) during the process of reconstructing the luma samples. When CFL prediction is enabled for a chroma block, the prediction process for the corresponding luma block is altered to 2×2 luma sums and a luma average, rather than outputting reconstructed luma samples. Accordingly, because the luma sums and average are computed during the luma prediction, the "read 1" stage described above is eliminated, as there is no need to read back out reconstructed luma sample values to separately compute the sums and averages.

Figure 4:
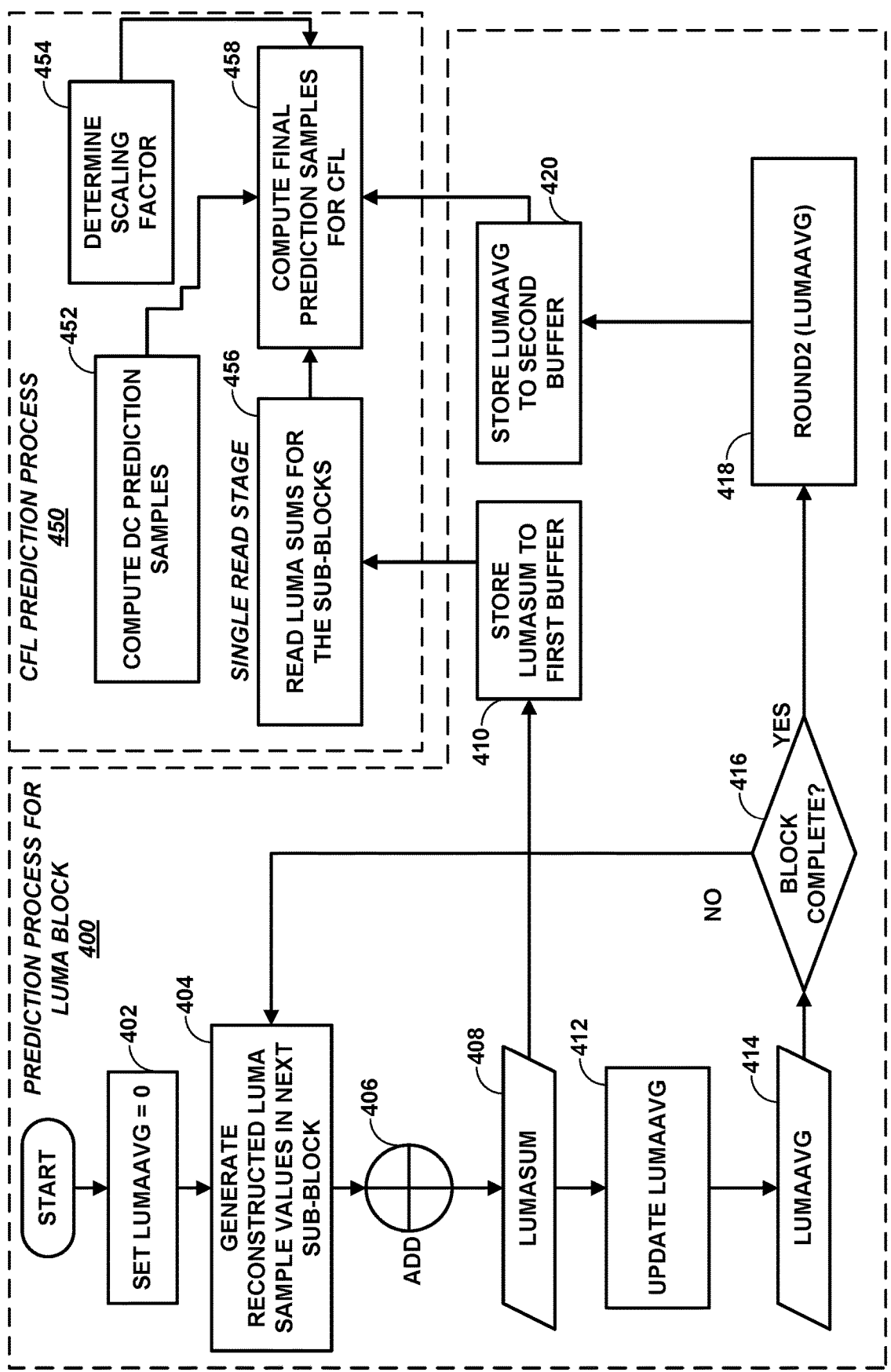
FIG. 4 is a flowchart showing an example decoding method according to the techniques of the disclosure.

FIG. 4 is a flowchart showing an example decoding method according to the techniques of the disclosure. The dashed blocks in FIG. 4 generally show the separation between the prediction process for a luma coding block (prediction process 400) and the CFL prediction process 450 for a corresponding chroma block. In this context, a corresponding chroma block is a chroma block (e.g., either U or V) that is co-located with the luma block. Video encoder 200 and video decoder 300 may be configured to perform prediction process 400 in situations where one or more chroma blocks co-located with the luma block are to be encoded and/or decoded using CFL. That is, in situations where CFL prediction is not used, video encoder 200 and video decoder 300 may not necessarily perform prediction process for luma block 400. The following will describe the CFL techniques of the disclosure with reference to video decoder 300. It should be understood that video encoder 200 may perform the same process in a reconstruction loop and may perform an reciprocal process when encoding the residual block for a chroma block.

Video decoder 300 may first perform prediction process 400 for a luma coding block by initializing the average value (LumaAvg) of the luma samples in the luma coding block to zero (402). Video decoder 300 may then generate reconstructed luma samples for the luma coding block in sub-block order (404). In some examples, the luma sub-blocks may be 2×2 luma samples in size (e.g., 2×2 luma sub-blocks). However, the techniques of this disclosure may be applicable for use with a generic sub-block size of N×M luma samples.

For example, different luma sub-blocks may be used for different chroma subsampling formats. In the AV1 coding format, 2×2 luma sub-blocks are used for 4:2:0 chroma subsampling, where chroma samples are subsampled relative to luma samples in each of the horizontal (X) and vertical (Y) directions. Video decoder 300 may be configured to use different sub-block sizes for different video coding formats or video coding standards based on the chroma subsampling format used. For example, if chroma samples are only subsampled in one direction (e.g., the X or Y direction), then the luma sub-block size may be 2×1 or 1×2. If there is no chroma sub-sampling, each chroma sample corresponds to a single luma sample. In this case, the luma "sub-block" would by 1×1 (i.e., a single sample). If chroma samples are sub-sampled more than 4:2:0, then a larger luma sub-block may be used (e.g., 3×3, 4×4, etc.), based on the subsampling ratio.

Video decoder 300 may decode the residual block corresponding to the luma coding block from data received in the encoded video bitstream. Video decoder 300 may also determine the prediction samples for the luma coding block based on the prediction mode used to encode the luma coding block. Video decoder 300 may then add the residual values to the corresponding prediction values to form reconstructed luma sample values.

As shown in FIG. 4, for each subsequent (e.g., next) sub-block of the reconstructed luma coding block, video decoder 300 may add together the reconstructed luma sample values in the sub-block (406) to generate a sum of the luma sample values (LumaSum, 406). Video decoder 300 may store the luma sum to a first buffer (410). The first buffer may be RAM or any type of memory unit. In addition, video decoder 300 may update the luma average for the reconstructed luma coding block (412) based on the generated luma sum, and any previously-accumulated average values for the block, to generate an average luma value for the reconstructed luma coding block (414).

If the currently processed sub-block of the luma coding block is the last sub-block (i.e., the block is complete) (416), video decoder 300 may round the current value of LumaAvg (418) and store the LumaAvg value to a second buffer (420). Again, the second buffer may be RAM or any other type of memory unit. The first buffer (410) and the second buffer (420) may be allocated space in the same memory unit or may be separate memory units.

If the currently processed sub-block of the luma coding block is not the last sub-block of the luma coding block (i.e., the block is not complete) (416), video decoder 300 may then generate the reconstructed luma sample values in the next sub-block (404) and repeat the storage of the luma sum (410) and updating the luma average (412). As can be seen in FIG. 4, reconstructed luma samples are not made available to CFL prediction process 450. Rather, CFL prediction process is provided the luma sums in the first buffer, and the luma average in the second buffer. However, it should be understood that the reconstructed luma samples may still be filtered (e.g., by loop filter unit 312 of FIG. 3) and stored in DPB 314 (see FIG. 3) for eventual output or use as reference samples for subsequently coded blocks.

CFL prediction process 450 may then determine prediction values using the techniques described above. However, because the luma sums and the luma average has already been calculated and stored to memory (e.g., the first buffer and the second buffer), CFL prediction process 450 need not read out reconstructed luma samples from memory. As such, the amount of memory needed to implement chroma from luma prediction is reduced compared to other techniques. In addition, the number of processing cycles needed to perform luma from chroma prediction is reduced.

Video decoder 300 may read the luma sums for the sub-blocks in a single memory read stage (456). In some examples, video decoder 300 may use odd-even memory banking of the first buffer to increase the speed of CFL prediction process 450. For example, using odd-even memory banking, the luma sums from two sub-blocks may be read in parallel. In addition, video decoder 300 may read the luma average stored in the second buffer. Video decoder 300 may use the read luma sums for the sub-blocks to compute final prediction samples for use in CFL prediction (458). First, video decoder 300 may determine a scaled luma sample value (Scaled Luma) for each chroma sample location. Video decoder 300 calculates the scaled luma sample value by determining the difference between a luma sum (e.g., the corresponding Luma sum) corresponding to the chroma sample and the luma average of the reconstructed luma block (LumaAvg). Video decoder 300 multiplies this difference by the scaling factor (e.g., the alpha scale value CflAlphaU or CflAlphaV) associated with the particular chroma component being decoded (e.g., U chroma or V chroma). Video decoder 300 may determine the scaling factor (454) from syntax elements signaled in the encoded video bitstream or may determine the scaling factor from video coding characteristics. Video decoder 300 then rounds the scaled difference to determine the scaled luma sample value (ScaledLuma) (458).

Video decoder 300 may then add the calculated scaled luma sample value with the corresponding DC prediction sample (DC) for the currently decoded chroma sample to produce an intermediate prediction sample value (458). In this regard, video decoder 300 may be configured to compute the DC prediction samples (452) substantially in parallel with performing prediction process 400 for the luma coding block. Video decoder 300 determines the DC prediction values using DC intra prediction. Video decoder 300 may then determine the final prediction sample value by clipping the intermediate prediction sample value between 0 and a maximum sample value (Max sample value) (458).

ScaledLuma=Round2Signed(alpha*(corresponding Luma sum−LumaAvg),6)

Intermediate prediction sample value=DC+Scaled-Luma

Final prediction sample value=clip(0,Intermediate prediction sample value,Max sample value)

After the final prediction values have been determined, video decoder 300 may then reconstruct the chroma sample values for the chroma block by adding the final prediction sample value to a corresponding decoded residual value. Video decoder 300 may decode residual values for the chroma block as described above with reference to FIG. 3.

Using the techniques of this disclosure, the RAM area requirement for a hardware implementation of CFL, considering an M×M block with an (N+2)-bit LumaSum format would be (M×M×(N+2))/4 bits. For a 64×64 luma coding block with a 10-bit luma sample bit-depth, the RAM area requirement for the first buffer would be 64×64×(10+2)/4=32×32×12=12,288 bits. The second buffer for storing the average may be small compared to the first buffer. For example, considering a 10-bit bit-depth for the luma sample, the second buffer may be 256×13=3,328 bits. Accordingly, for a 64×64 block with a 10-bit bit-depth, the techniques of this disclosure would use 15,616 bits of RAM compared to the 40,960 bits used in the some existing techniques. This represents a 60% reduction in RAM area.

The techniques of this disclosure may also reduce the processing cycles needed to perform CFL prediction. If processing K pixels per cycle, post luma prediction process 400, the processing cycles performed may be:

Cycles by "read 1" stage=0 cycles as the "read 1" stage is eliminated and happens in parallel with luma prediction. No extra cycles are needed.

Cycles by "read 2" stage=(M×M)/4K

Total cycles=(M×M)/4K

Accordingly, due to elimination of the "read 1" stage of prior CFL techniques, the cycle count also gets reduced to half. Thus, both the memory (e.g., RAM) area and overall number of processing cycles are reduced.

Figure 5:
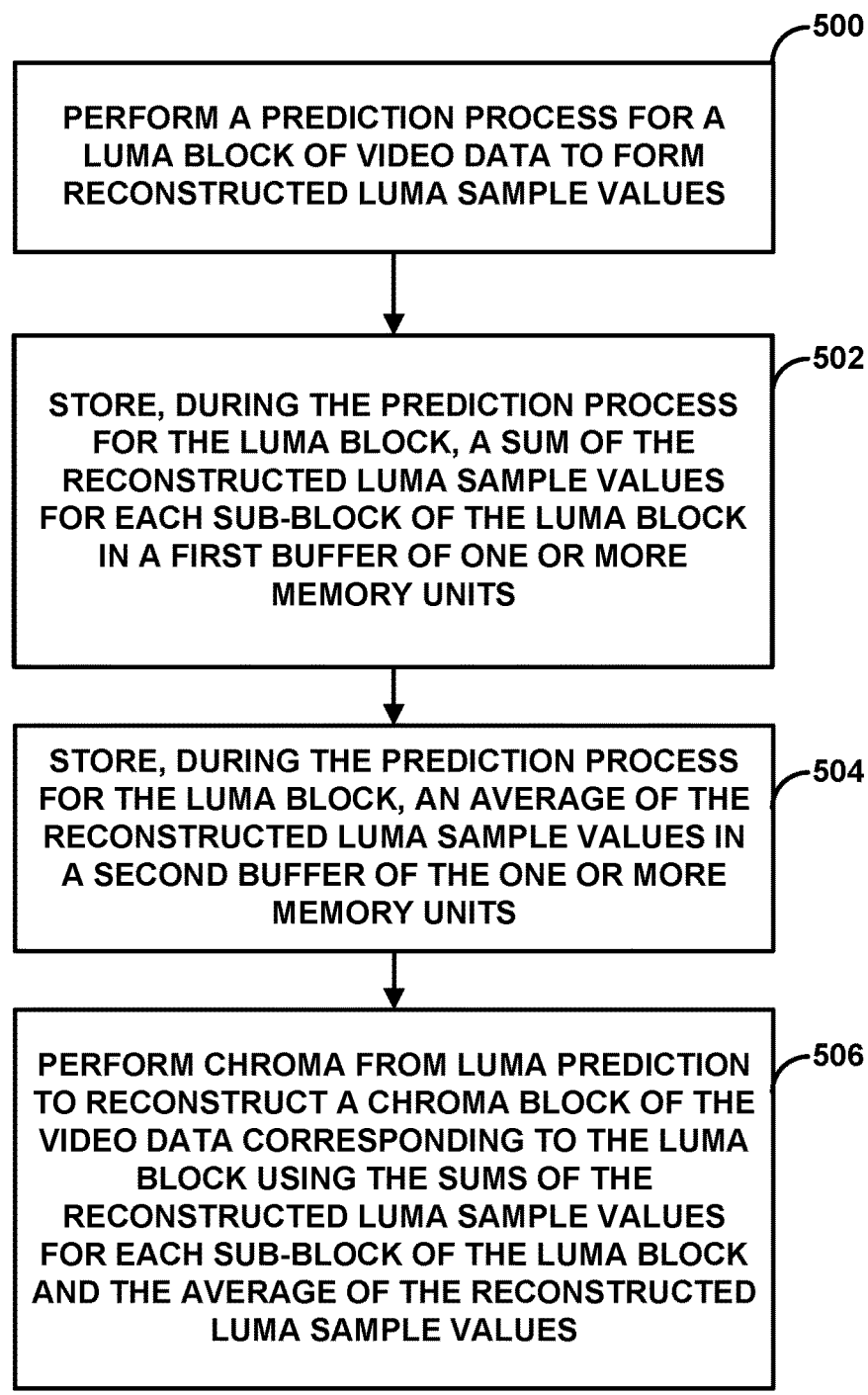
FIG. 5 is a flowchart showing another example decoding method according to the techniques of the disclosure.

FIG. 5 is a flowchart showing another example decoding method according to the techniques of the disclosure. The techniques of FIG. 5 may be performed by one or more structural units of video decoder 300, including intra prediction unit 318.

In one example, video decoder 300 is configured to perform a prediction process for a luma block of the video data to form reconstructed luma sample values (500). Video decoder 300 may be configured to store, during the prediction process for the luma block, a sum of the reconstructed luma sample values for each sub-block of the luma block in a first buffer of one or more memory units (502). Video decoder 300 may be further configured to store, during the prediction process for the luma block, an average of the reconstructed luma sample values in a second buffer (504). In a further example of the disclosure, video decoder 300 is further configured to calculate, during the prediction process for the luma samples of the luma block, the sums of the reconstructed luma sample values for each sub-block of the luma block, and calculate, during the prediction process for the luma samples of the luma block, the average of the reconstructed luma sample values.

Video decoder 300 may then perform chroma from luma prediction to reconstruct a chroma block of the video data corresponding to the luma block using the sums of the reconstructed luma sample values for each sub-block of the luma block and the average of the reconstructed luma sample values (506). For example, video decoder 300 may be configured to perform chroma from luma prediction by reconstructing each chroma sample value from a corresponding luma sum (e.g., 2×2 luma sum from a corresponding 2×2 luma sub-block) and the average of the reconstructed luma values.

In one example, video decoder 300 may calculate each respective chroma sample using the difference between a respective sum of the reconstructed luma sample values of a respective sub-block (e.g., 2×2 sub-block) corresponding to the respective chroma sample, and the average of the reconstructed luma sample values. In a further example, video decoder 300 may calculate each respective chroma sample using a scaling factor to scale the difference between a respective sum of the reconstructed luma sample values of a respective sub-block (e.g., 2×2 sub-block) corresponding to the respective chroma sample, and the average of the reconstructed luma sample values. In a still further example, video decoder 300 may perform a DC intra prediction process to determine a respective DC prediction values for each respective chroma sample of the chroma block, and to calculate each respective chroma sample by adding the respective DC prediction value to the difference or scaled difference between a respective sum of the reconstructed luma sample values of a respective sub-block (e.g., 2×2 sub-block) corresponding to the respective chroma sample, and the average of the reconstructed luma sample values.

In one example of the disclosure, video decoder 300 may perform chroma from luma prediction for chroma samples of the chroma block corresponding to the luma block using the sums of the reconstructed luma sample values for each sub-block of the block and the average of the reconstructed luma sample values, without reading the reconstructed luma samples values from the one or more memory units.

By storing the sum of the reconstructed luma sample values for each sub-block and the average of the reconstructed luma sample values in buffers during the prediction process for the luma block, video decoder 300 need not read out any luma sample values to perform chroma from luma prediction for a chroma block. As such, the amount of memory needed to implement chroma from luma prediction is reduced compared to other techniques. In addition, the number of processing cycles needed to perform luma from chroma prediction is reduced.

In a further example of the disclosure, video decoder 300 may be configured to perform a DC intra prediction process to determine a respective DC prediction values for each respective chroma sample of the chroma block. Video decoder 300 may calculate a respective scaled luma sample value for each respective chroma sample as a function of a scaling factor for the chroma block, a respective sum of the reconstructed luma sample values of a respective sub-block corresponding to the respective chroma sample, and the average of the reconstructed luma sample values. In one example, video decoder 300 may access the sums of the reconstructed luma sample values for each sub-block of the luma block from the first buffer using odd-even banking.

Video decoder 300 may also calculate a respective intermediate prediction sample value for each respective chroma sample as a function of the respective DC prediction value and the respective scaled luma sample value, and then calculate a respective final prediction sample value for each respective chroma sample as a function of the respective intermediate prediction sample value and a maximum sample value. Video decoder 300 may reconstruct respective chroma sample values using the respective final prediction sample values. In one example, video decoder 300 may perform the DC intra prediction process to determine the respective DC prediction values for each respective chroma sample of the chroma block in parallel with performing the prediction process for the luma block.

In a further example, video decoder 300 may decode a block of residual values for the chroma block, and add each respective residual value to a corresponding respective final prediction sample value to reconstruct the chroma sample values of the chroma block. Video decoder 300 may further display a picture including pixels values determined from the reconstructed chroma block.

Other illustrative examples of the disclosure are described below.

Clause 1—A method of decoding video data, the method comprising: performing a prediction process for a luma block of the video data to form reconstructed luma sample values; storing, during the prediction process for the luma block, a sum of the reconstructed luma sample values for each sub-block of the luma block in a first buffer; storing, during the prediction process for the luma block, an average of the reconstructed luma sample values in a second buffer; and performing chroma from luma prediction to reconstruct a chroma block of the video data corresponding to the luma block using the sums of the reconstructed luma sample values for each sub-block of the luma block and the average of the reconstructed luma sample values.

Clause 2—The method of Clause 1, further comprising: calculating, during the prediction process for the luma samples of the luma block, the sums of the reconstructed luma sample values for each sub-block of the luma block; and calculating, during the prediction process for the luma samples of the luma block, the average of the reconstructed luma sample values.

Clause 3—The method of Clause 1 or 2, wherein performing chroma from luma prediction to reconstruct the chroma block of the video data comprises: performing chroma from luma prediction for chroma samples of the chroma block corresponding to the luma block using the sums of the reconstructed luma sample values for each sub-block of the block and the average of the reconstructed luma sample values, without reading the reconstructed luma samples values from the one or more memory units.

Clause 4—The method of any of Clauses 1-3, wherein the sub-block is a 2×2 sub-block, and wherein performing chroma from luma prediction to reconstruct the chroma block of the video data comprises: performing a DC intra prediction process to determine a respective DC prediction values for each respective chroma sample of the chroma block; calculating a respective scaled luma sample value for each respective chroma sample as a function of a scaling factor for the chroma block, a respective sum of the reconstructed luma sample values of a respective 2×2 sub-block corresponding to the respective chroma sample, and the average of the reconstructed luma sample values; calculating a respective intermediate prediction sample value for each respective chroma sample as a function of the respective DC prediction value and the respective scaled luma sample value; calculating a respective final prediction sample value for each respective chroma sample as a function of the respective intermediate prediction sample value and a maximum sample value; and reconstructing respective chroma sample values using the respective final prediction sample values.

Clause 5—The method of Clause 4, wherein performing the DC intra prediction process comprises: performing the DC intra prediction process to determine the respective DC prediction values for each respective chroma sample of the chroma block in parallel with performing the prediction process for the luma block.

Clause 6—The method of Clause 4 or 5, further comprising: decoding a block of residual values for the chroma block; and adding each respective residual value to a corresponding respective final prediction sample value to reconstruct the chroma sample values of the chroma block.

Clause 7—The method of any of Clauses 1-6, wherein performing the chroma from luma prediction, comprises: accessing the sums of the reconstructed luma sample values for each sub-block of the luma block from the first buffer using odd-even banking.

Clause 8—The method of any of Clause 1-7, further comprising: displaying a picture including pixels values determined from the reconstructed chroma block.

Clause 9—An apparatus comprising means for performing any combination of methods of Clauses 1-8.

Clause 10—An apparatus comprising a memory and one or more processors, the one or more processors configured to perform any combination of methods of Clauses 1-8.

Clause 11—A non-transitory computer-readable medium storing instructions that, when executed, cause one or more processors to perform any combination of methods of Clauses 1-8.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video data, the apparatus comprising:
one or more memory units configured to store video data; and
one or more processors implemented in circuitry and in communication with the one or more memory units, the one or more processors configured to:
perform a prediction process for a luma block of the video data to form reconstructed luma sample values;
determine, during the prediction process for the luma block to form the reconstructed luma sample values, a sum of the reconstructed luma sample values for each sub-block of a plurality of sub-blocks of the luma block, wherein the sum of the reconstructed luma sample values is determined based on a summation of each of the reconstructed luma sample values within the respective sub-block with one another;
store, during the prediction process for the luma block to form the reconstructed luma sample values, the sum of the reconstructed luma sample values for each sub-block of the luma block in a first buffer of the one or more memory units;
store, during the prediction process for the luma block to form the reconstructed luma sample values, an average of the reconstructed luma sample values in a second buffer of the one or more memory units; and
perform chroma from luma prediction to reconstruct a chroma block of the video data corresponding to the luma block using the sums of the reconstructed luma sample values for each sub-block of the luma block and the average of the reconstructed luma sample values.

2. The apparatus of claim 1, wherein the one or more processors are further configured to:
calculate, during the prediction process for the luma block to form the reconstructed luma sample values, the average of the reconstructed luma sample values.

3. The apparatus of claim 1, wherein the one or more processors are further configured to:
perform chroma from luma prediction for chroma samples of the chroma block corresponding to the luma block using the sums of the reconstructed luma sample values for each sub-block of the luma block and the average of the reconstructed luma sample values, without reading the reconstructed luma samples values from the one or more memory units.

4. The apparatus of claim 1, wherein the sub-block is a 2×2 sub-block, and wherein the one or more processors are further configured to:
perform a DC intra prediction process to determine a respective DC prediction values for each respective chroma sample of the chroma block;
calculate a respective scaled luma sample value for each respective chroma sample as a function of a scaling factor for the chroma block, a respective sum of the reconstructed luma sample values of a respective 2×2 sub-block corresponding to the respective chroma sample, and the average of the reconstructed luma sample values;
calculate a respective intermediate prediction sample value for each respective chroma sample as a function of the respective DC prediction value and the respective scaled luma sample value;
calculate a respective final prediction sample value for each respective chroma sample as a function of the respective intermediate prediction sample value and a maximum sample value; and
reconstruct respective chroma sample values using the respective final prediction sample values.

5. The apparatus of claim 4, wherein the one or more processors are further configured to:
perform the DC intra prediction process to determine the respective DC prediction values for each respective chroma sample of the chroma block in parallel with performing the prediction process for the luma block.

6. The apparatus of claim 4, wherein the one or more processors are further configured to:
decode a block of residual values for the chroma block; and
add each respective residual value to a corresponding respective final prediction sample value to reconstruct the chroma sample values of the chroma block.

7. The apparatus of claim 1, wherein to perform the chroma from luma prediction, the one or more processors are further configured to:
access the sums of the reconstructed luma sample values for each sub-block of the luma block from the first buffer using odd-even banking.

8. The apparatus of claim 1, further comprising:
a display configured to display a picture including pixels values determined from the reconstructed chroma block.

9. The apparatus of claim 1, wherein the apparatus is a mobile device.

10. The apparatus of claim 9, further comprising:
a receiver configured to receive the video data via a wireless communication standard.

11. A method of decoding video data, the method comprising:
performing a prediction process for a luma block of the video data to form reconstructed luma sample values;
determining, during the prediction process for the luma block to form the reconstructed luma sample values, a sum of the reconstructed luma sample values for each sub-block of a plurality of sub-blocks of the luma block, wherein the sum of the reconstructed luma sample values is determined based on a summation of each of the reconstructed luma sample values within the respective sub-block with one another;
storing, during the prediction process for the luma block to form the reconstructed luma sample values, the sum of the reconstructed luma sample values for each sub-block of the luma block in a first buffer;
storing, during the prediction process for the luma block to form the reconstructed luma sample values, an average of the reconstructed luma sample values in a second buffer; and
performing chroma from luma prediction to reconstruct a chroma block of the video data corresponding to the luma block using the sums of the reconstructed luma sample values for each sub-block of the luma block and the average of the reconstructed luma sample values.

12. The method of claim 11, further comprising:
calculating, during the prediction process for the luma block to form the reconstructed luma sample values, the average of the reconstructed luma sample values.

13. The method of claim 11, wherein performing chroma from luma prediction to reconstruct the chroma block of the video data comprises:
performing chroma from luma prediction for chroma samples of the chroma block corresponding to the luma block using the sums of the reconstructed luma sample values for each sub-block of the luma block and the average of the reconstructed luma sample values, without reading the reconstructed luma samples values from the one or more memory units.

14. The method of claim 11, wherein the sub-block is a 2×2 sub-block, and wherein performing chroma from luma prediction to reconstruct the chroma block of the video data comprises:
performing a DC intra prediction process to determine a respective DC prediction values for each respective chroma sample of the chroma block;
calculating a respective scaled luma sample value for each respective chroma sample as a function of a scaling factor for the chroma block, a respective sum of the reconstructed luma sample values of a respective 2×2 sub-block corresponding to the respective chroma sample, and the average of the reconstructed luma sample values;
calculating a respective intermediate prediction sample value for each respective chroma sample as a function of the respective DC prediction value and the respective scaled luma sample value;
calculating a respective final prediction sample value for each respective chroma sample as a function of the respective intermediate prediction sample value and a maximum sample value; and
reconstructing respective chroma sample values using the respective final prediction sample values.

15. The method of claim 14, wherein performing the DC intra prediction process comprises:
performing the DC intra prediction process to determine the respective DC prediction values for each respective chroma sample of the chroma block in parallel with performing the prediction process for the luma block.

16. The method of claim 14, further comprising:
decoding a block of residual values for the chroma block; and
adding each respective residual value to a corresponding respective final prediction sample value to reconstruct the chroma sample values of the chroma block.

17. The method of claim 11, wherein performing the chroma from luma prediction, comprises:
accessing the sums of the reconstructed luma sample values for each sub-block of the luma block from the first buffer using odd-even banking.

18. The method of claim 11, further comprising:
displaying a picture including pixels values determined from the reconstructed chroma block.

19. A non-transitory computer-readable storage medium storing instructions that, when executed, cause one or more processors of a device configured to decode video data to:
perform a prediction process for a luma block of the video data to form reconstructed luma sample values;
determine, during the prediction process for the luma block to form the reconstructed luma sample values, a sum of the reconstructed luma sample values for each sub-block of a plurality of sub-blocks of the luma block, wherein the sum of the reconstructed luma sample values is determined based on a summation of each of the reconstructed luma sample values within the respective sub-block with one another;
store, during the prediction process for the luma block to form the reconstructed luma sample values, the sum of the reconstructed luma sample values for each sub-block of the luma block in a first buffer;
store, during the prediction process for the luma block to form the reconstructed luma sample values, an average of the reconstructed luma sample values in a second buffer; and
perform chroma from luma prediction to reconstruct a chroma block of the video data corresponding to the luma block using the sums of the reconstructed luma sample values for each sub-block of the luma block and the average of the reconstructed luma sample values.

20. The non-transitory computer-readable storage medium of claim 19, wherein the instructions further cause the one or more processors to:
calculate, during the prediction process for the luma block to form the reconstructed luma sample values, the average of the reconstructed luma sample values.

21. The non-transitory computer-readable storage medium of claim 19, wherein the instructions further cause the one or more processors to:
perform chroma from luma prediction for chroma samples of the chroma block corresponding to the luma block using the sums of the reconstructed luma sample values for each sub-block of the luma block and the average of the reconstructed luma sample values, without reading the reconstructed luma samples values from the one or more memory units.

22. The non-transitory computer-readable storage medium of claim 19, wherein the sub-block is a 2×2 sub-block, and wherein the instructions further cause the one or more processors to:

perform a DC intra prediction process to determine a respective DC prediction values for each respective chroma sample of the chroma block;
calculate a respective scaled luma sample value for each respective chroma sample as a function of a scaling factor for the chroma block, a respective sum of the reconstructed luma sample values of a respective 2×2 sub-block corresponding to the respective chroma sample, and the average of the reconstructed luma sample values;
calculate a respective intermediate prediction sample value for each respective chroma sample as a function of the respective DC prediction value and the respective scaled luma sample value;
calculate a respective final prediction sample value for each respective chroma sample as a function of the respective intermediate prediction sample value and a maximum sample value; and
reconstruct respective chroma sample values using the respective final prediction sample values.

23. The non-transitory computer-readable storage medium of claim 22, wherein the instructions further cause the one or more processors to:
perform the DC intra prediction process to determine the respective DC prediction values for each respective chroma sample of the chroma block in parallel with performing the prediction process for the luma block.

24. The non-transitory computer-readable storage medium of claim 22, wherein the instructions further cause the one or more processors to:
decode a block of residual values for the chroma block; and
add each respective residual value to a corresponding respective final prediction sample value to reconstruct the chroma sample values of the chroma block.

25. The non-transitory computer-readable storage medium of claim 19, wherein to perform the chroma from luma prediction, the instructions further cause the one or more processors to:
access the sums of the reconstructed luma sample values for each sub-block of the luma block from the first buffer using odd-even banking.

26. The non-transitory computer-readable storage medium of claim 19, wherein the instructions further cause the one or more processors to:
display a picture including pixels values determined from the reconstructed chroma block.

27. An apparatus configured to decode video data, the apparatus comprising:
means for performing a prediction process for a luma block of the video data to form reconstructed luma sample values;
means for determining, during the prediction process for the luma block to form the reconstructed luma sample values, a sum of the reconstructed luma sample values for each sub-block of a plurality of sub-blocks of the luma block, wherein the sum of the reconstructed luma sample values is determined based on a summation of each of the reconstructed luma sample values within the respective sub-block with one another;
means for storing, during the prediction process for the luma block to form the reconstructed luma sample values, the sum of the reconstructed luma sample values for each sub-block of the luma block in a first buffer;
means for storing, during the prediction process for the luma block to form the reconstructed luma sample values, an average of the reconstructed luma sample values in a second buffer; and means for performing chroma from luma prediction to reconstruct a chroma block of the video data corresponding to the luma block using the sums of the reconstructed luma sample values for each sub-block of the luma block and the average of the reconstructed luma sample values.

28. The apparatus of claim 27, further comprising:

means for calculating, during the prediction process for the luma block to form the reconstructed luma sample values, the average of the reconstructed luma sample values.

29. The apparatus of claim 27, wherein the means for performing chroma from luma prediction comprises:

means for performing chroma from luma prediction for chroma samples of the chroma block corresponding to the luma block using the sums of the reconstructed luma sample values for each sub-block of the luma block and the average of the reconstructed luma sample values, without reading the reconstructed luma samples values from the one or more memory units.

30. The apparatus of claim 27, wherein the sub-block is a 2×2 sub-block, and wherein the means for performing chroma from luma prediction comprises:

means for performing a DC intra prediction process to determine a respective DC prediction values for each respective chroma sample of the chroma block;

means for calculating a respective scaled luma sample value for each respective chroma sample as a function of a scaling factor for the chroma block, a respective sum of the reconstructed luma sample values of a respective 2×2 sub-block corresponding to the respective chroma sample, and the average of the reconstructed luma sample values;

means for calculating a respective intermediate prediction sample value for each respective chroma sample as a function of the respective DC prediction value and the respective scaled luma sample value;

means for calculating a respective final prediction sample value for each respective chroma sample as a function of the respective intermediate prediction sample value and a maximum sample value; and means for reconstructing respective chroma sample values using the respective final prediction sample values.

31. The apparatus of claim 30, wherein the means for performing the DC intra prediction process comprises:

means for performing the DC intra prediction process to determine the respective DC prediction values for each respective chroma sample of the chroma block in parallel with performing the prediction process for the luma block.

32. The apparatus of claim 30, further comprising:

means for decoding a block of residual values for the chroma block; and means for adding each respective residual value to a corresponding respective final prediction sample value to reconstruct the chroma sample values of the chroma block.

33. The apparatus of claim 27, wherein the means for performing the chroma from luma prediction, comprises:

means for accessing the sums of the reconstructed luma sample values for each sub-block of the luma block from the first buffer using odd-even banking.

34. The apparatus of claim 27, further comprising:

means for displaying a picture including pixels values determined from the reconstructed chroma block.

* * * * *